United States Patent [19]

Pawlowski et al.

[11] Patent Number: 5,173,023
[45] Date of Patent: Dec. 22, 1992

[54] WIND TURBINE GENERATOR BLADE AND RETENTION SYSTEM

[75] Inventors: Joseph W. Pawlowski, Granada Hills; J. Ford Johnston, Sunland, both of Calif.

[73] Assignee: Cannon Energy Corporation, Mojave, Calif.

[21] Appl. No.: 743,926

[22] Filed: Aug. 12, 1991

[51] Int. Cl.$^5$ ............................................. B63H 1/20
[52] U.S. Cl. ................................... 416/207; 416/239; 416/209
[58] Field of Search .................. 416/204 R, 205, 207, 416/208, 209, 214 R, 239

[56] References Cited

U.S. PATENT DOCUMENTS

| | | |
|---|---|---|
| 1,414,742 | 5/1922 | Leitner . |
| 1,836,700 | 12/1931 | Caldwell . |
| 1,865,170 | 6/1932 | Carter ................................. 416/208 |
| 1,870,361 | 8/1932 | Hamilton ............................ 416/207 |
| 1,947,073 | 2/1934 | Wilson ................................. 416/207 |
| 2,041,849 | 5/1936 | McCauley . |
| 2,465,007 | 3/1949 | Bragdon et al. . |
| 2,754,915 | 7/1956 | Echeverria, Jr. . |
| 3,028,292 | 4/1962 | Hinds . |
| 3,159,221 | 12/1964 | Gaubis et al. . |
| 3,349,157 | 10/1967 | Parsons . |
| 3,390,393 | 6/1968 | Upton . |
| 3,586,460 | 6/1971 | Toner . |
| 3,967,996 | 7/1976 | Kamov et al. . |
| 4,260,332 | 4/1981 | Weingart et al. . |
| 4,295,790 | 10/1981 | Eggert, Jr. . |
| 4,392,781 | 7/1983 | Mouille et al. . |
| 4,411,598 | 10/1983 | Okada . |
| 4,524,499 | 6/1985 | Grimes et al. ................... 416/239 X |
| 4,634,341 | 1/1987 | Monroe . |
| 4,668,169 | 5/1987 | Perry . |
| 4,728,263 | 3/1988 | Basso . |
| 4,773,824 | 9/1988 | Kiss ................................. 416/205 X |
| 4,806,077 | 2/1989 | Bost . |
| 4,976,587 | 12/1990 | Johnston et al. . |

Primary Examiner—Thomas E. Denion
Assistant Examiner—Todd Mattingly
Attorney, Agent, or Firm—William W. Haefliger

[57] ABSTRACT

A propeller blade cuff having a root end and a first annular flange at the root end, and a wind turbine generator hub having a second annular flange to be attached to the first flange comprising a clamp ring having multiple sections, the sections having flange-receiving and clamping grooves, each extending part way about the annular flanges; and fastener structure interconnecting the ring sections to exert adjustable tension for adjustably retaining the flanges in the grooves.

6 Claims, 6 Drawing Sheets

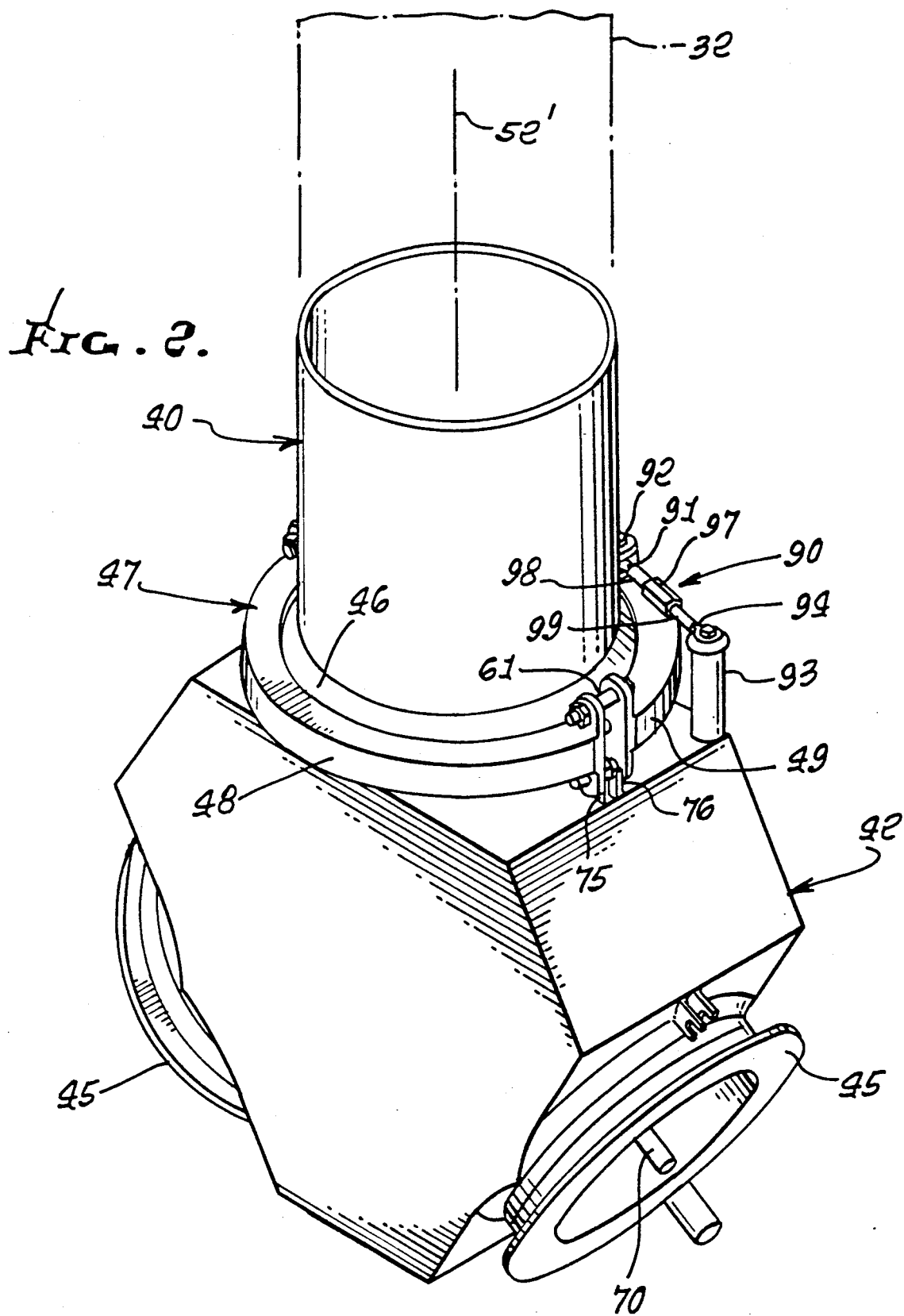

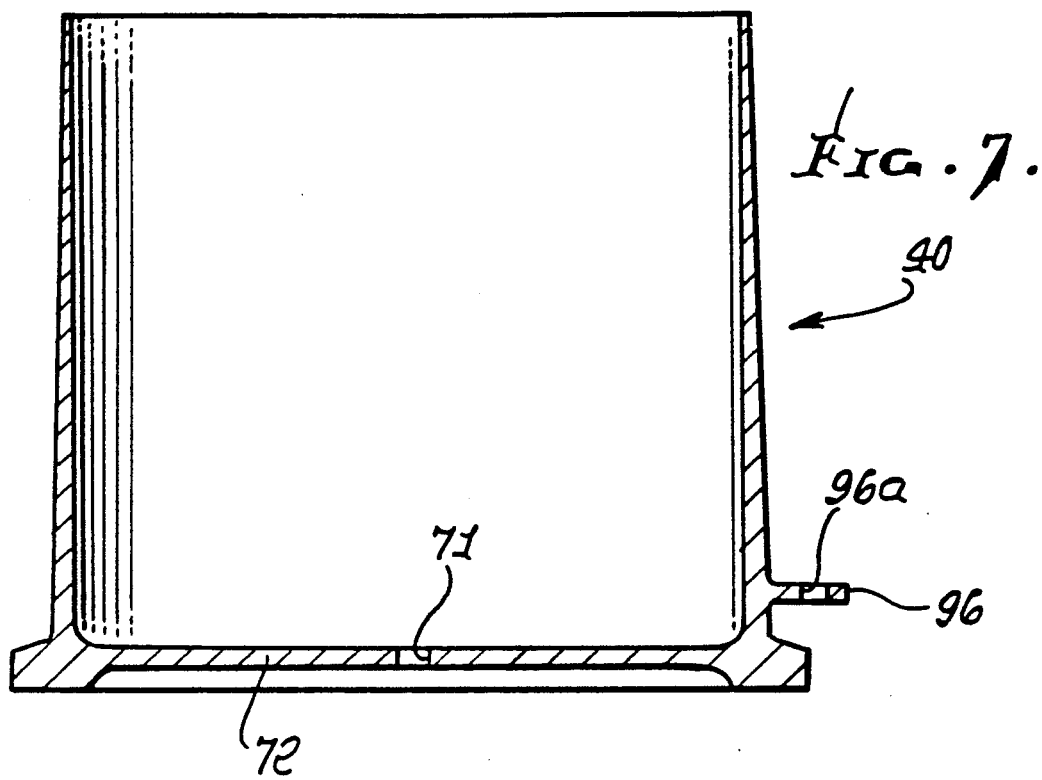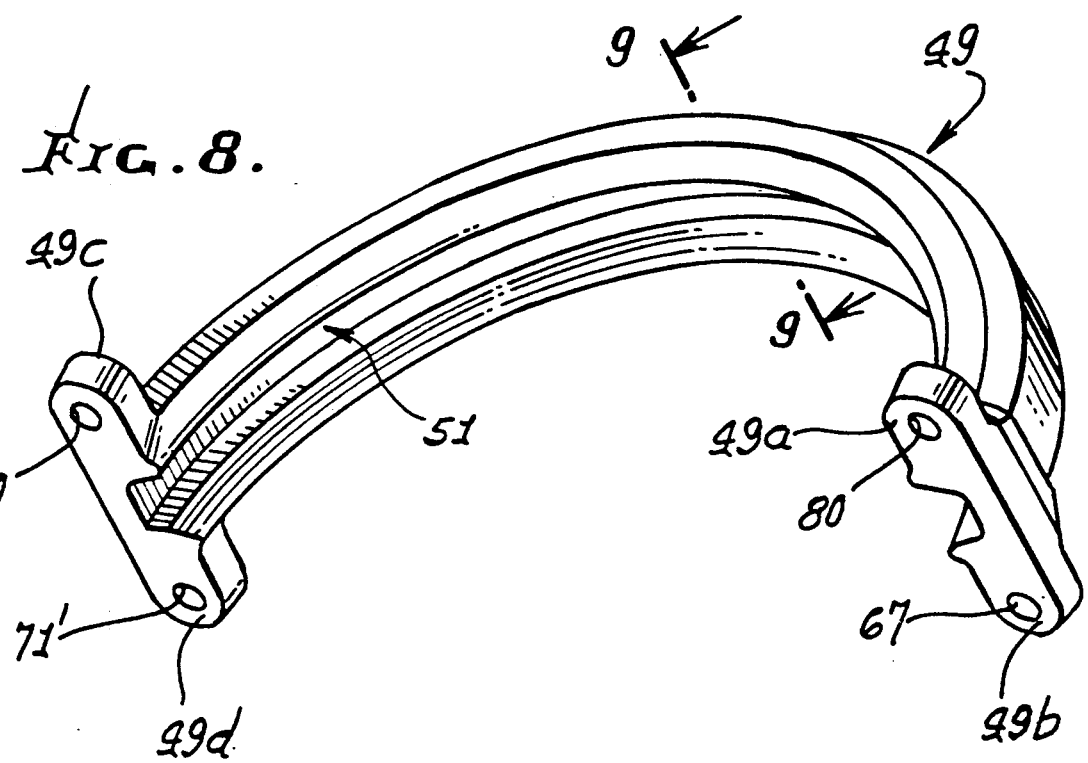

WIND TURBINE GENERATOR BLADE AND RETENTION SYSTEM

BACKGROUND OF THE INVENTION

This invention relates generally to wind turbine generator apparatus, and more particularly to connection of and adjustment of propeller blades on rotary hubs of such apparatus.

In recent years, it has become apparent that conventional methods of generating electricity will soon be insufficient to meet the world's ever-growing need for electric power. Several factors, including the pollution which results from the combustion of fossil fuels, the dangers associated with the operation of nuclear reactors, and the limitations inherent in the traditional hydroelectric, as well as in the more modern solar energy approaches to the generation of electricity, have encouraged the development of alternative sources of electric power, such as the wind turbine generator.

Wind turbines convert wind energy to electrical energy in a manner analogous to the way in which the windmills of Western Europe converted wind energy to mechanical energy for pumping water or operating grinding mills. A wind turbine generally includes a rotor, which is mounted for rotation near the apex of a tower approximately 18 to 50 meters in height. The rotor acts as the prime mover for an electrical generator, which provides power through transformers and substation-controlled connections, to the local utility power grid.

Generally, wind energy projects include the installation of large numbers of wind turbine generating systems at locations having favorable wind conditions. Several of these so-called "wind farms" are located in the state of California.

A major problem which has been associated with wind energy projects is mechanical failure in existing wind turbines. It has been found that the direction of the wind is not always along the rotational axis of the rotor. Off-axis wind components cause mechanical loads on the blades that were not adequately considered when the original blades were designed. Particularly, when the wind rises along a slope to a wind turbine placed at the top of the slope, it creates an additional "yawing" (side-to-side) load. This is sometimes called "vertical flow". When the wind comes in from either side ("yawed flow"), it creates an additional "pitching" load (bottom to top or top to bottom, depending on the yawed flow direction). Although such wind turbines have "active yaw systems" which are designed to rotate in response to changes in wind direction so that the rotor always faces the direction from which the wind is blowing, it has been found in practice that the rate of yaw rotation is slow compared to the rapid and variable changes in wind direction which are common in nature. These additional loads have caused major damage in turbine systems in areas such as California.

A factor contributing to mechanical failure of existing wind turbine blades lies in the circumstance that the aerodynamic loads, which begin at the tip, are integrated along the length of the blade. Therefore, longer blades (especially those producing more energy due to increased airfoil efficiency) will have higher loads at the base or root, thus making the design of the structure more critical.

The blades also weigh on the order of 1,000–1,200 pounds each, which is considered excessive for their function by modern technology standards. These blades, or very similar designs, are used in thousands of turbines installed in California.

In the past, the propeller blades of such apparatus were bolted to the generator hubs, and it was found that such bolts tended to fail at objectionably frequent intervals. Also, there was no easy way to obtain trim adjustment of the blades about their length axes once they were bolted to the hub. Such adjustment is needed to optimize the "bite" of the angled blade into or with wind stream. There is need to overcome these problems and difficulties in a simple, efficient manner to achieve much better connection of blade root ends to the generator hub, and at the same time, to accommodate blade angular adjustment.

SUMMARY OF THE INVENTION

It is a major object of the invention to provide improved blade connection and adjustment means necessary to overcome the above problems and difficulties. Basically, the environment of the invention comprises a propeller cuff having a root end and a first annular flange at that end, and a wind turbine generator hub having a second annular flange to be attached to the first flange; the improvement of the invention then comprises:

a) a clamp ring having multiple sections, the sections having flange-receiving and clamping grooves, each extending part way about the annular flanges, b) and fastener means interconnecting the ring sections to exert adjustable tension for adjustably retaining the flanges in the grooves.

As will be seen, there are typically two of such clamp ring sections, each extending about half way about the flanges; and the sections have opposed ends and the fastener means have adjustable connection with those opposed ends. Also, the two sections typically have auxiliary flanges projecting away from the clamping grooves, such flanges defining the opposed ends; and the fastener means have attachment to such auxiliary flanges.

Another object of the invention is to provide first and second of the auxiliary flanges at each end of each clamp ring section, the first and second auxiliary flanges projecting in opposite directions, the fastener means including a primary fastener interconnecting the first auxiliary flanges at opposed ends of two sections, and the fastener means including a secondary fastener interconnecting the second auxiliary flanges at the opposed ends of the two sections. In this regard, the primary fasteners may advantageously include turnbuckle structure; and the secondary fasteners may include bolt structure. Guide means may also be provided on the hub to interfit the primary fasteners for maintaining them in predetermined alignment relative to the hub.

Yet another object of the invention is the provision of adjustable rotary displacement of the cuff relative to the hub.

As will be seen, the clamping sections may have arc shape and define an axis about which the flanges extend, the flanges and grooves being tapered to provide wedge interfit between the flanges and sections. Multiple such propellers may each be connected to a wind generator hub, in the manner referred to, for quick connection and disconnection, as well as adjustment.

These and other objects and advantages of the invention, as well as the details of an illustrative embodiment,

DRAWING DESCRIPTION

FIG. 2 is a perspective view of a blade cuff end connection to a wind generator hub, in accordance with the invention;

FIG. 7 is a vertical section taken through the blade cuff of FIGS. 5 and 6;

FIG. 8 is an enlarged perspective view of one clamp ring section; and

DETAILED DESCRIPTION

Figure 1:
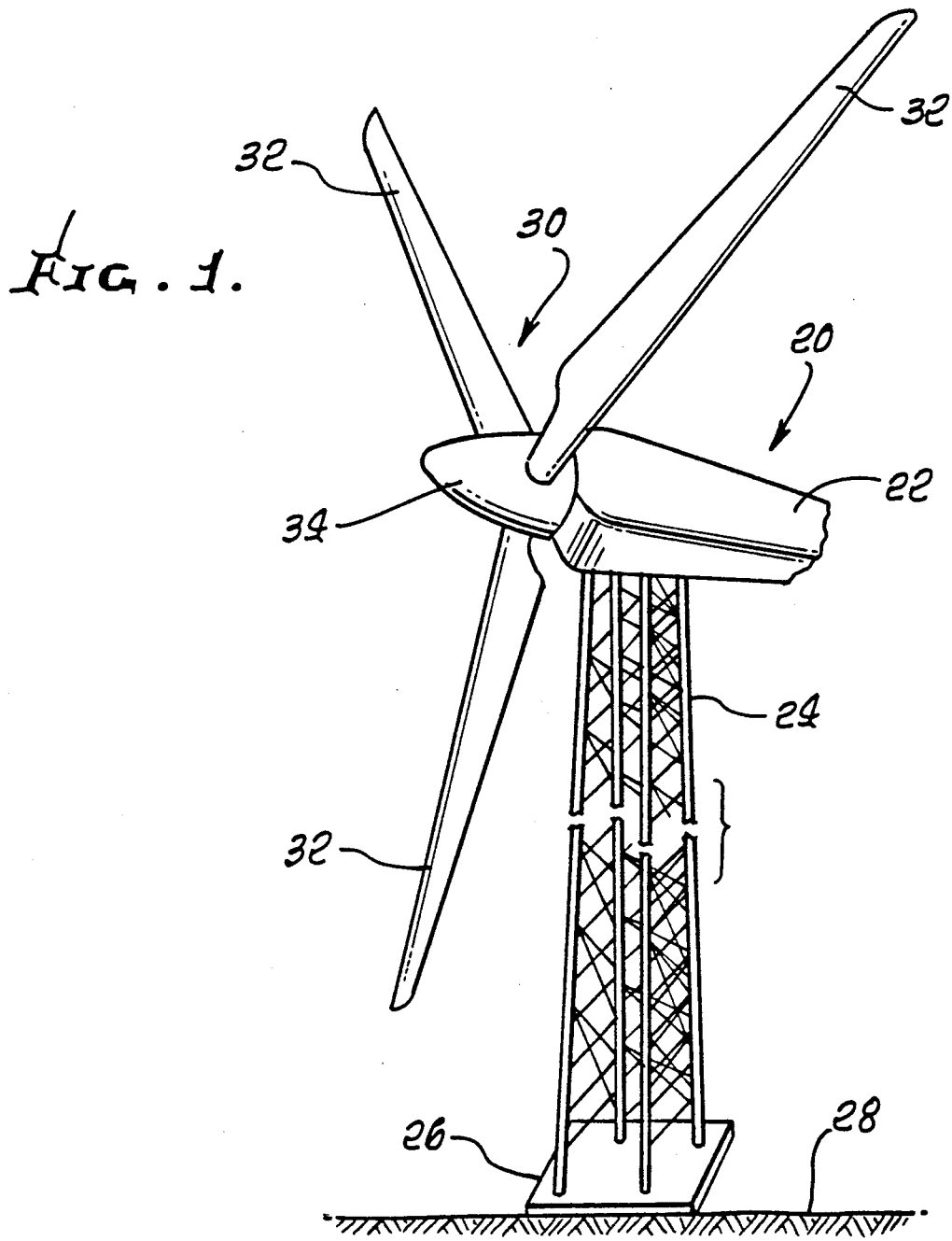
FIG. 1 is a perspective view of a wind turbine generator having a rotor employing three turbine propeller blades, and connected to a wind generator hub in accordance with the present invention.

Referring to FIG. 1, a wind turbine generating system 20 includes a generator housing assembly 22 supported atop a tower 24. Tower 24 is affixed to a base 26 which is firmly secured to the surface of the earth 28. Guywires (not shown) may extend from tower 24 to fixtures (not shown) in the earth 28 so as to secure tower 24 against lateral loads.

System 20 includes a turbine rotor 30 having three blades 32 affixed to a central hub (not shown in FIG. 1) beneath a cone 34. The hub of rotor 30 is affixed to a shaft (not shown) extending longitudinally in housing 22 (perpendicular to the plane of blades 32). As is well known in the art, housing 22 typically includes a gear box for increasing the speed of revolution of the generator drive relative to that of the shaft; a three phase induction generator powered by the output of the gear box which supplies electric power to the local utility power grid; a semi-active yaw drive control system which causes the rotor to face into the wind; and normal speed and emergency braking systems for quickly bringing the spinning rotor to a stop should an overspeed condition occur. Typically, an anemometer (not shown) mounted atop housing 22 monitors wind speed so that under severe wind conditions, which could cause damage to the rotor blades or wind turbine system, the housing 22 is turned so that rotor 30 is parallel to the wind, thus decreasing loads on the blades and the other components within housing 22.

Extending the description to FIGS. 2-5, the blade 32 has a tubular cuff 40 with a root end, and a "first" annular flange 41 at said root end. That flange is to be connected to hub 42 which rotates about axis 43, and transmits drive via shaft 44 to the generator. The hub mounts the three blades at separation angles of 120°; and the hub carries three "second" annular flanges 45 affixed to the hub via annular structures 46. Note also a centering post 70 projecting from the hub to fit a hole 71 in a crosspiece 72 attached to the cuff.

In accordance with the invention, a clamp ring 47 is provided to have multiple like sections, as for example the two sections 48 and 49. These in turn have flange receiving and clamping grooves 50 and 51 facing inwardly toward the blade axis 52.

Figure 9:
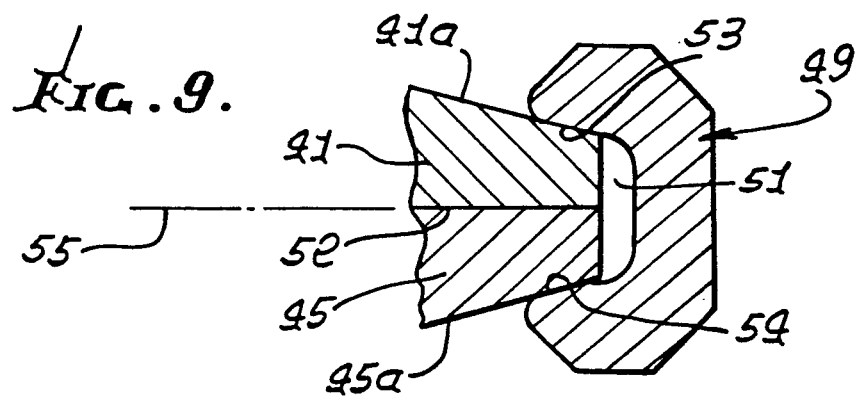
FIG. 9 is an enlarged cross sectional view taken through the FIG. 8 clamp ring section, on lines 9—9 thereof.

FIG. 9 shows the flanges 41 and 45 having outermost portions received into a groove 51 formed by the C-shape of section 49. Note interengagement of the flanges at interface 52, and the tapered surfaces 41a and 45a on the flanges engaged by correspondingly tapered upper and lower surfaces 53 and 54 of the section 49. Section 48 has similar cross-sectional configuration. The taper of surfaces 41a and 53 relative to the plane 55 defined by interengagement locus 52 (normal to axis 52) is about 15°; and the taper of surfaces 45a and 54 relative to plane 55 is also about 15°.

Figure 4:
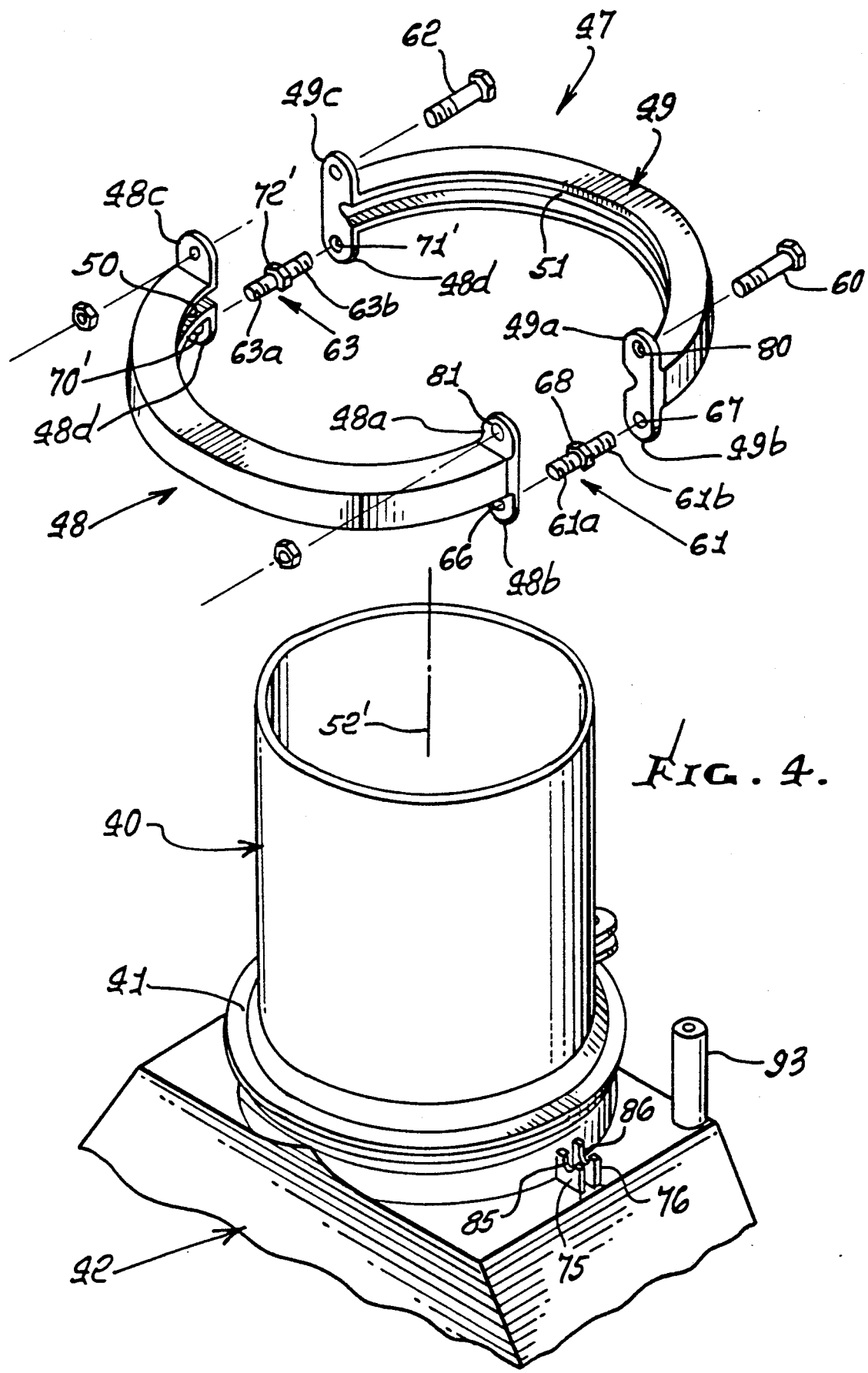
FIG. 4 is an exploded view showing clamp ring sections and fasteners separated from the hub and aligned in position to be connected over blade cuff and hub flanges, in accordance with the invention.

Each of the clamping sections 48 and 49 extends about half way (170° for example) about the axis 52, and their terminal ends are interconnected by fastener means to exert adjustable tension for adjustably and tightly retaining the flanges 41 and 45 in the grooves 50 and 51, thereby holding the flanges 41 and 45 in interconnected relation. Reference to FIGS. 4 and 8 shows that the sections 48 and 49 have auxiliary flanges 48a–48d, 49a–49d that project away from the grooves, and that define opposed ends of the sections. Thus, flanges 48a and 48b project oppositely upwardly and downwardly away from the groove 50 at one end of section 48; and flanges 48c and 48d project oppositely upwardly and downwardly away from the groove 50 at the other end of the section 48. Likewise, flanges 49a and 49b project oppositely away from the groove 51 at one end of section 49; and flanges 49c and 49d project oppositely away from the groove 51 at the other end of section 49.

Flanges 48a and 49a are interconnected by fastener 60; flanges 48b and 49b are interconnected by fastener 61; flanges 48c and 49c are interconnected by fastener 62; and flanges 48d and 49d are interconnected by fastener 63. Fasteners 60 and 61 are parallel with one another; and fasteners 62 and 63 ar parallel with one another. Fasteners 61 and 63 may be considered as "primary" fasteners and may include turnbuckle structure. The latter includes oppositely threaded ends 61a and 61b of fastener 61 connected to threaded openings at 66 and 67 in the flanges 48b and 49b, and a nut 68 with nut flats on the fastener 61; and oppositely threaded ends 63a and 63b of fastener 63 connected to threads at 70 and 71 in the flanges 48d and 49d, and a nut 72 with nut flats on the fastener 63. Adjustable rotation of the fasteners 61 and 63 draws together or separates the opposed ends of the sections 48 and 49 to adjustably clamp the flanges 41 and 45.

The "secondary" fasteners 60 and 62 define threaded bolt structures which interconnect flanges 48a and 49a, and flanges 48c and 49c, respectively. Thus, for example, fastener 60 passes through opening 80 in flange 49a and thread connects to threaded opening 81 in flange 48a; and similar connection applies to bolt 62 and flanges 49c and 48c. Tightening of the bolts tends to draw together the flanges 41 and 45; however, once the adjustable fasteners 61 and 63 are set, the bolts 60 and 61 when tightened, act as locks, ensuring maintenance of the adjusted tightened position of the fasteners 61 and 63 and thereby ensuring maintenance of the adjusted clamping condition of the sections 48 and 49 on the flanges 41 and 45.

Figure 3:
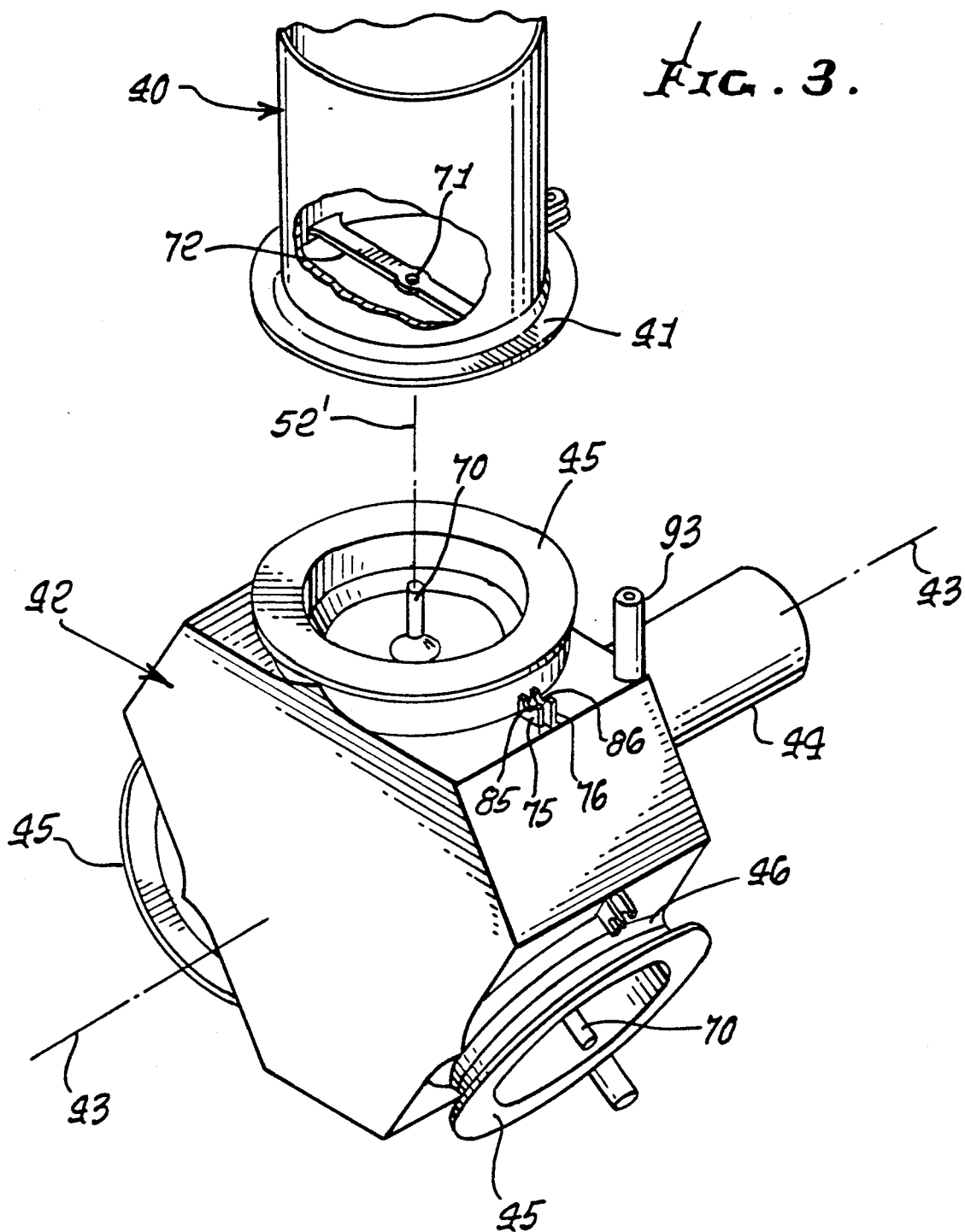
FIG. 3 is an exploded view showing a blade cuff axially displaced from the hub.

Guide means are provided on the hub to interfit each primary fastener 61 and 63, for maintaining it in predetermined alignment relative to the hub. See in FIGS. 2 and 3 the parallel guide plates 75 and 76 at each of the two opposed ends of the sections 48 and 49 the plates having U-shaped notches 85 and 86 to closely fit the two opposed shanks of each fasteners 61 and 63, to thereby align each such fastener. The fasteners 61 and 63 are typically held in parallel relation, whereby the sections 48 and 49 are blocked against rotation about axis 52. As seen in FIGS. 2-4, plates 75 and 76 are integral with the hub.

On the other hand, adjustable means is provided to interconnect the hub 42 and the cuff flange 41, for effecting adjustable rotary (trim) displacement of the cuff and blade, relative to the hub, about axis 52. See for example in FIG. 2 the turnbuckle link 90 having one end 91 attached at 92 to the cuff 40, and an opposite end 92 attached via upstanding part 93 to the hub.

Figure 5:
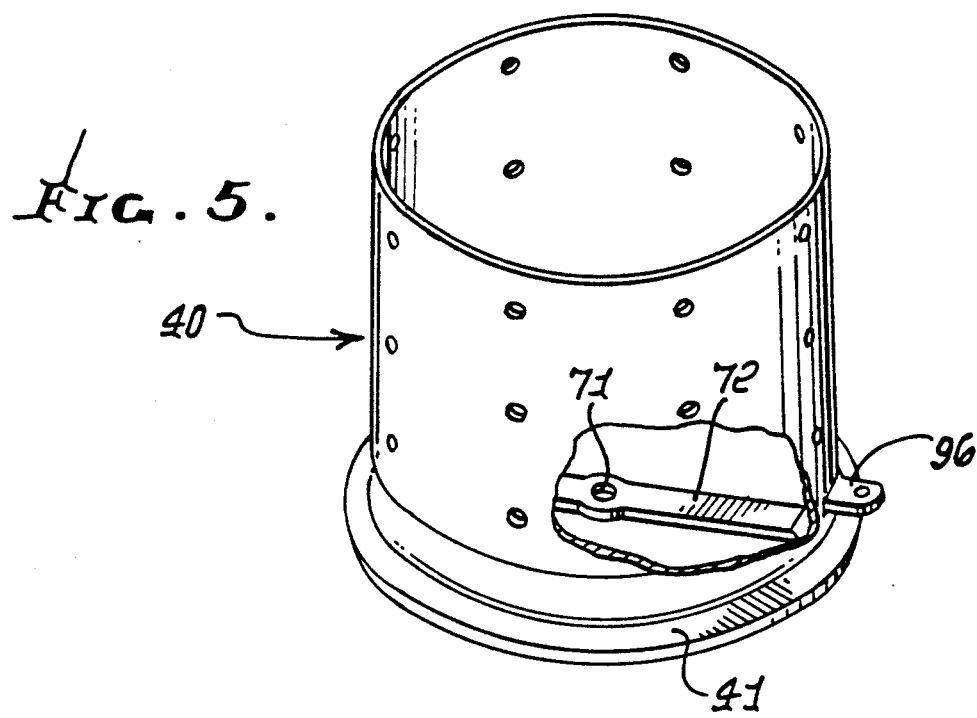
FIG. 5 is a perspective view of a blade cuff.
Figure 6:
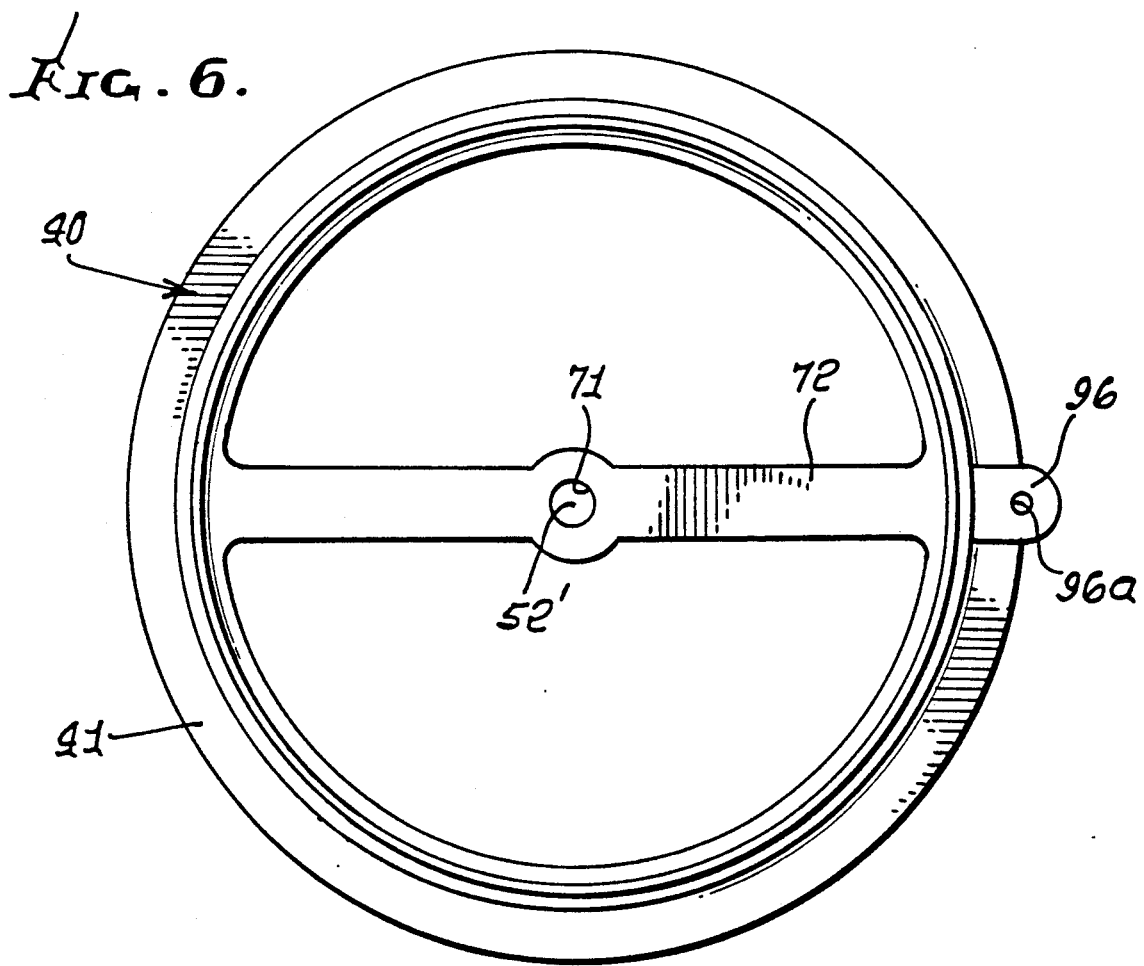
FIG. 6 is a top plan view of the FIG. 5 cuff.

FIGS. 5-7 shows a radial projection 96 on the cuff 40 and to which attachment 92 may be made, via opening 96a in 96. Projection 96 lies above the level of flange 41 and the section 49 Note link turnbuckle nut 97 having opposite internal threads connected to link parts 98 and 99. Accordingly, when clamping of the flanges 41 and 45 by clamp sections 48 and 49 is slightly relieved, as by loosening adjustment of, say, two fasteners 60 and 61, the turnbuckle link 80 can be rotated in one direction to adjustably rotate blade 32 in one direction about its radial axis 52, or the link can be rotated in the opposite direction to adjustably rotate blade 32 in the opposite direction about its axis 52, to best accommodate blade "bite" into the prevailing wind, for achieving desired propeller speed at that wind velocity. Thereafter, the fasteners 60 and 61 are tightened, as described above to clamp the blade in position relative to the hub.

We claim:

1. In combination with a propeller blade cuff having a root end and a first annular flange at said root end, and a wind turbine generator hub having a second annular flange to be attached to said first flange, the improvement comprising
    a) a clamp ring having multiple sections, said sections having flange-receiving and clamping grooves, each extending part way about said annular flanges,
    b) and fastener means interconnecting said ring sections to exert adjustable tension for adjustably retaining said flanges in said grooves,
    c) there being two of said sections, each extending about half way about said flanges, said sections having opposed ends and said fastener means having adjustable connection with said opposed ends, said sections having auxiliary flanges projecting away from said grooves, and defining said opposed ends, said fastener means having attachment to said auxiliary flanges,
    d) there being first and second of said auxiliary flanges at each end of each section, said first and second auxiliary flanges projecting in opposite directions, said fastener means including a primary fastener interconnecting said first auxiliary flanges at opposed ends of two sections, and said fastener means including a secondary fastener interconnecting said second auxiliary flanges at said opposed ends of said two sections,
    e) said primary fastener including turnbuckle structure, and said secondary fastener including bolt structure,
    f) and including guide means integral with the hub and interfitting said primary fastener for maintaining the primary fastener in predetermined alignment relative to said hub.

2. In combination with a propeller blade cuff having a root end and a first annular flange at said root end, and a wind turbine generator hub having a second annular flange to be attached to said first flange, the improvement comprising
    a) a clamp ring having multiple sections, said sections having flange-receiving and clamping grooves, each extending part way about said annular flanges,
    b) and fastener means interconnecting said ring sections to exert adjustable tension for adjustably retaining said flanges in said grooves,
    c) there being two of said sections, each extending about half way about said flanges, said sections having opposed ends and said fastener means having adjustable connection with said opposed ends, said sections having auxiliary flanges projecting away from said grooves, and defining said opposed ends, said fastener means having attachment to said auxiliary flanges,
    d) there being first and second of said auxiliary flanges at each end of each section, said first and second auxiliary flanges projecting in opposite directions, said fastener means including a primary fastener interconnecting said first auxiliary flanges at opposed ends of two sections, and said fastener means including a secondary fastener interconnecting said second auxiliary flanges at said opposed ends of said two sections,
    e) and including adjustable means including a linkage interconnecting the hub and said first flange for effecting adjustable rotary displacement of said cuff relative to said hub.

3. The improvement of claim 1 wherein said sections have arc shape and define an axis about which said flanges extend.

4. The improvement of claim 1 wherein said flanges and grooves are tapered to provide wedge interfit between the flanges and sections.

5. The combination of claim 1 including said wind turbine generator and a tower supporting said generator, there being multiple blades supported by said hub to rotate about a generally horizontal axis.

6. The combination of claim 5 wherein said generator is an electrical power generator, there being multiple of said clamp rings attaching multiple blade cuffs to the hub of said generator.

* * * * *